Feb. 6, 1951 R. R. ALEXANDER ET AL 2,540,803
LOG CARRIER
Filed Feb. 15, 1949 2 Sheets-Sheet 2
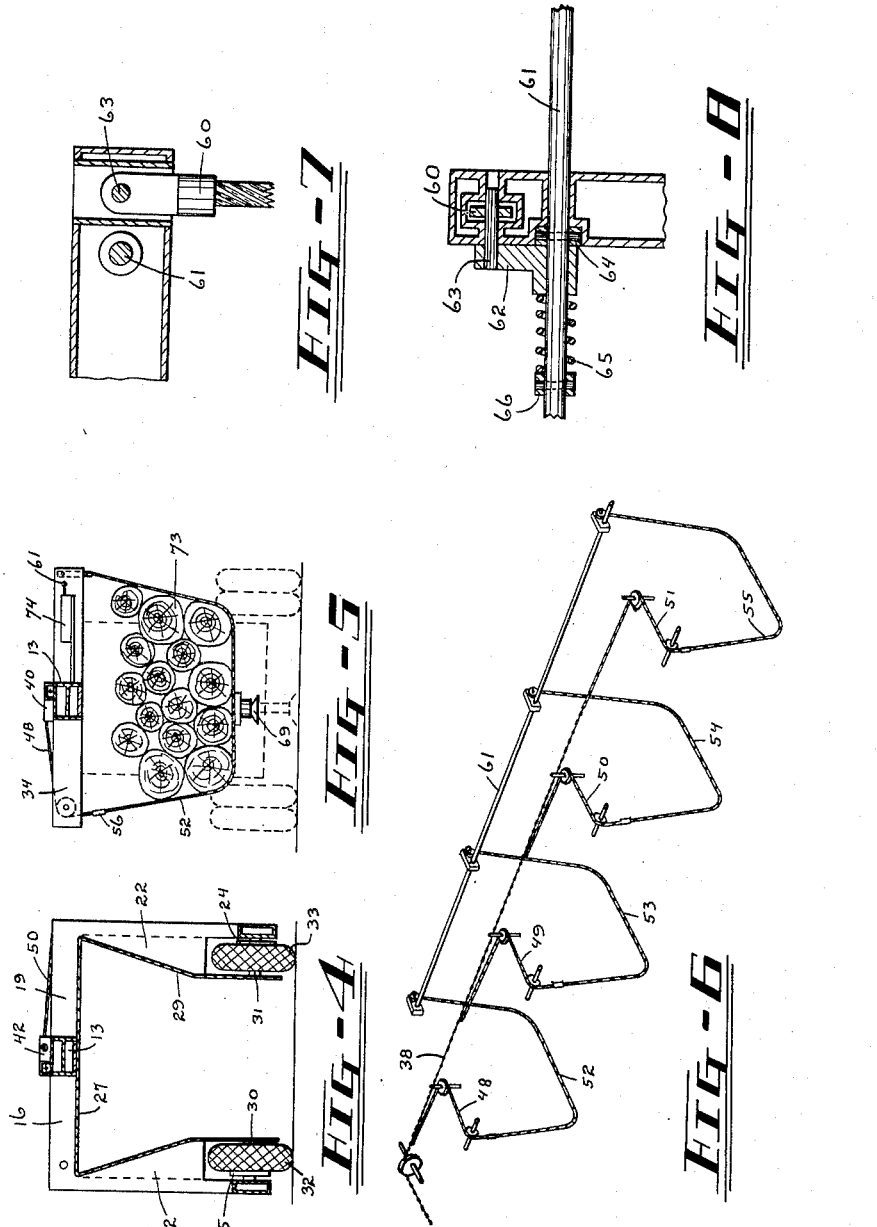
INVENTORS
Ronald Rouleau Alexander
and William P. O'Brien
by Edward N. Fetherstonhaugh
ATTORNEY Patented Feb. 6, 1951

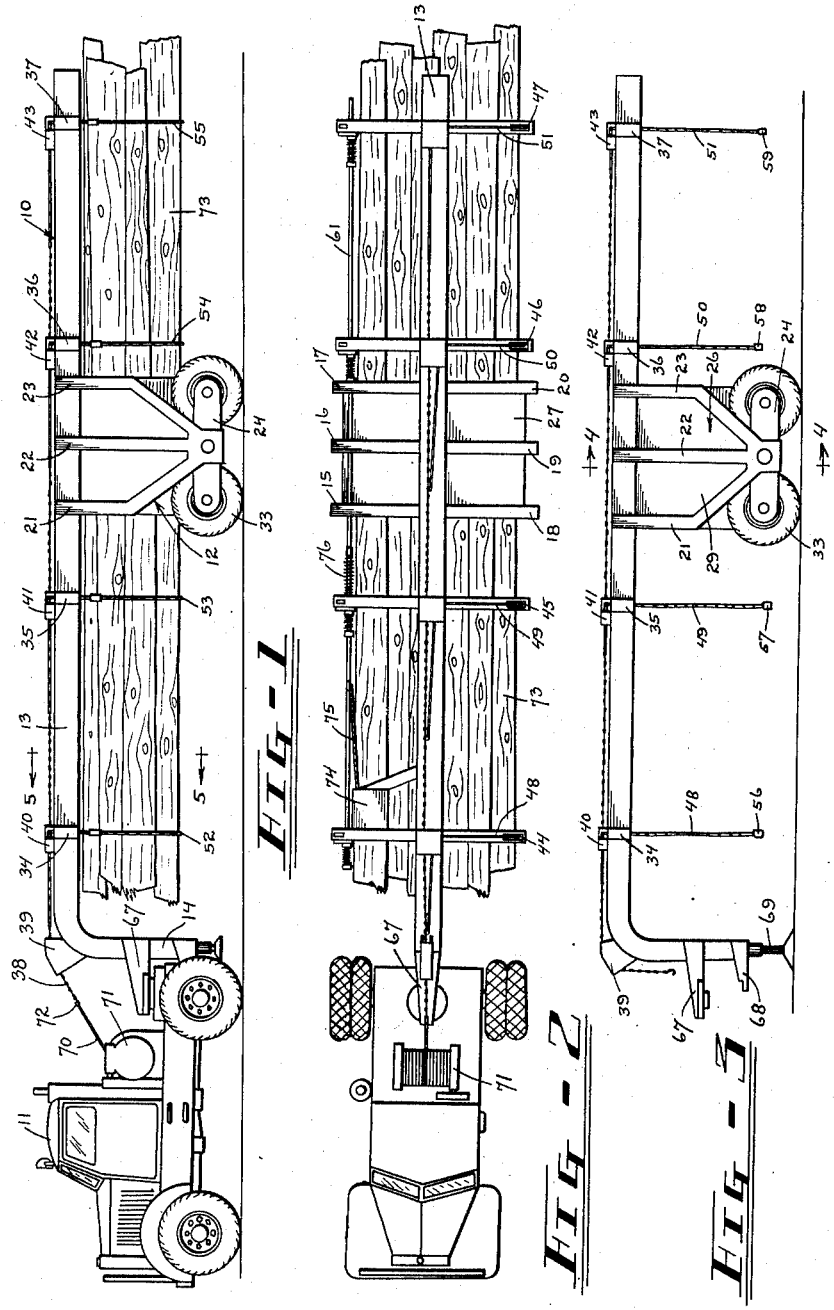

2,540,803

UNITED STATES PATENT OFFICE 2,540,803

LOG CARRIER

Ronald Rouleau Alexander and William P. O'Brien, Montreal, Quebec, Canada

Application February 15, 1949, Serial No. 76,514

3 Claims. (Cl. 214—65.3)

1

The invention relates to improvements in a log carrier as described in the present specification and illustrated in the accompanying drawings that form a part of the same.

The invention consists essentially of the novel features of construction as pointed out broadly and specifically in the claims for novelty following a description containing an explanation in detail of an acceptable form of the invention.

The objects of the invention are to devise a log carrier particularly adapted for use in connection with logging operations in the bush and which may be used to particular advantage in the loading and transporting of logs of small diameter; to furnish a log carrier having overhead suspension means for the loading of logs on the carrier and which suspend the loaded logs clear of ground; to facilitate the loading and transporting of logs; to make a trailer-type log carrier adapted to be attached to a tractor, a crawler or other vehicle, and which is provided with over-head suspension means for the loading and supporting of quantities of logs, and which suspension means are power operated from the tractor or crawler and adapted for quick release of the logs therefrom in the unloading of the carrier; to construct a log carrier consisting of comparatively few and simple parts and easy to manufacture; and generally to provide a log carrier that is durable in construction, simple to operate for its mechanical loading of logs, and that is efficient in its use.

In the drawings:

Figure 1 is a side view of the log carrier loaded with logs and attached to a tractor.

Figure 2 is a plan view of Figure 1.

Figure 3 is a side view of the log carrier unloaded and showing the loading and supporting slings in their open position.

Figure 4 is a vertical sectional view as taken on the line 4—4 in Figure 3.

Figure 5 is a vertical sectional view as taken on the line 5—5 in Figure 1.

Figure 6 is a diagrammatic view of the rigging of the carrier.

Figure 7 is an enlarged fragmentary detail showing the sling connection to the release mechanism.

Figure 8 is an enlarged fragmentary detail showing the quick release mechanism.

Like numerals of reference indicate corresponding parts in the various figures.

Referring to the drawings, the log carrier, as indicated by the numeral 10, is in the form of a trailer adapted to be attached to and drawn by a tractor 11, a crawler or other type of vehicle, and consists of an inverted U-shaped frame-work 12 forming the body portion, mounted on wheels, at the top of which and centrally located, a beam 13 extends lengthwise and beyond the front and rear ends. This overhead center beam 13 is of considerable length and size and is preferably of metal, as are the component parts of the carrier.

While this inverted U-shaped frame-work or body 12 may be fashioned in various ways, in the present instance it is made integral with the center beam 13, which beam is bent downward adjacent to its front end to form the vertical end 14. The center beam is suitably formed with members 15, 16 and 17, and 18, 19 and 20, extending horizontally outward from each side respectively, these members or cross beams forming the top of the frame-work; each of these top beams continuing vertically downward and providing the side pieces 21, 22 and 23, forming the two sides of the body 12. The outside members 21 and 23 bend inwardly approximately half way down, continuing downward to merge with the bottom portion of the straight center piece 22 to form a somewhat Y-shaped bottom end to each of the sides of the body, at which point each of the sides is connected to a rocker beam, 24 and 25 respectively.

The frame-work or body 12 is provided with a metal lining 26 suitably secured to the inside of same and being of the same general shape as that of the body 12, having a top 27, sides 28 and 29 and being open at the bottom, as is the frame-work or body 12. An axle extends outward from the outside surface of each of the sides 28 and 29 of the lining adjacent to the bottom end thereof, these axles or connecting rods, 30 and 31 respectively, being fixedly secured in position or made integral with the lining side. To each of these axles or shafts is journalled a rocker beam adjacent to its outer end, the axle extending through the rocker beam to be fixedly secured to the side of the body.

A plurality of wheels, in this instance a pair, 32 and 33, are rotatably mounted on axles fixedly secured on the inside face of each of the rocker beams, the wheels being mounted to the rocker beam in tandem. Each of the rocker beams are journalled on its axle or shaft to permit it to rock as the wheels go over uneven ground.

A plurality of suspension or support arms, 34, 35, 36 and 37 extend outwardly on each side of the center beam 13, spaced apart at predetermined intervals, and being fixedly secured to the beam or made integral therewith.

The rigging of the log carrier consists of a chain 38 extending through a fairlead 39 positioned on top of the center beam adjacent to the bend in the front thereof, and continuing freely along the top of the center beam terminating short of the rear end of the same. Fairleads 40, 41, 42 and 43 are located on the top of the center beam, one each at the junction of the center beam and the support arms, each of which has a fairlead, 44, 45, 46 and 47 respectively, positioned at its outer end, all being on the same side of the beam 13. Cables 48, 49, 50 and 51, fixedly secured to the chain 38 lead out from the same, each cable extending out to the end of a support arm through the fairleads associated therewith; the front cable 48 is connected to the front end of the chain 38 and forms a continuation of the same, while the other cables lead from the side of the chain to the fairleads. Each of these hoisting cables 48, 49, 50 and 51 extend somewhat beyond the outer end of its respective support arm and is detachably secured to an independent cable, 52, 53, 54 and 55 respectively, by means of a basket hook, 56, 57, 58 and 59 respectively, these latter cables being of a length to extend down from the end of the hoisting cable and under to the opposite end of their respective support arm, this end of each of the cables 52, 53, 54 and 55 having a flat elongated cable fitting 60 fixedly secured thereto, the outer end of which has an aperture or eye therethrough.

A release rod 61 extends through the end of each of the suspension or support arms and the top beams 18, 19 and 20 of the frame-work or body 12, being on the opposite end of the arms to that on which the fairleads are positioned. This release rod extends parallel to the center beam 13 and is slidable in the support arms and the top beams of the body, and operates a quick release mechanism located at the end of each of the support arms.

The release mechanism consists of a bracket 62 slidably mounted on the release rod adjacent the front face of the support arm and having a pin 63 fixedly secured to and extending horizontally out from its inner face to slidably engage in a slot or aperture in the support arm extending above and being parallel to the release rod extending through the arm. A collar 64 is fixedly secured on the release rod within the arm and being flush with the front face of the arm adjacent to or abutting the inside face of the bracket 62. A spring 65 is positioned on the release rod between the outside face of the bracket 62 and a collar or stop 66 fixedly mounted on the release rod a predetermined distance from the bracket, and is adapted to be compressed when the bracket is drawn forward on the release rod. Each release mechanism may be manually operated independently of the others or all of them may be mechanically operated simultaneously, as hereinafter described.

The detachable cable is secured to its respective release mechanism by means of the fitting 60 being inserted in the support arm through a vertical slot in same, the pin 63 engaging the eye of the fitting to thus secure the cable to the support arm, the withdrawing of the pin from the fitting allowing the cable to drop out of the support arm. These cables 52, 53, 54 and 55, as attached to the hoisting cables and to the release mechanism form slings The trailer is provided with suitable connections for its attachment to the tractor or crawler, these connections 67 and 68 being secured to the lower portion of the front vertical end 14 of the center beam and extending outward therefrom, and a suitable type jack is secured to and extends vertically downward from the end of this member 14, and acts as both a support for the front portion of the trailer and as a means of lifting the front end up for its attachment to the vehicle. The jack 69 closes up to be clear of the ground when the log carrier is secured to the tractor or crawler.

When the log carrier is secured to the vehicle, the front end of the chain 38 is secured to the cable 70 on the winch 71 located on the rear of the tractor, by means of a hook 72 at the end of the chain, or other suitable means.

In the operation of the log carrier, the same is backed up over the pile of logs to be transported, the logs usually being piled in ricks or otherwise supported clear of the ground. The pile of logs now being between the sides of the frame-work, the cables or slings 52, 53, 54 and 55 are each manually detached from their respective hoisting cable, as shown in Figure 3, and brought under the logs and attached to the hoisting cables, the winch on the tractor being set in motion to draw the chain 38 forward on the cross-beam, the hoisting cables moving with the chain and drawing the slings upward to lift the log pile from its support and suspend same from the cross-beam and clear of the ground, the logs 73 rolling into position in the slings as they are lifted upward, the hoisting apparatus not having to lift actual "dead weight." A chain stopper is located in the fairlead 39 adapted to support the weight of the suspended logs and relieving the winch of that weight.

The body of the log carrier is positioned somewhat to the rear of the center of the cross-beam affording a better balance, and the logs, being carried in a horizontal position and clear of the ground, are not damaged during their transportation, nor can they become caught on various obstructions on the ground.

Upon arrival at their destination, the logs may be left on the carrier, which may be detached from the tractor, the jack being lowered to support the front end of the cross-beam.

In the unloading of the logs from the trailer or log carrier, the quick release mechanism is operated to release the slings from that side of the cross-beam, the cables dropping down and allowing the logs to go free. In many cases the logs are unloaded into a pit, the carrier in this case being backed over the pit and the release mechanism operated to permit the dropping of the cables, which drop down into the pit and hang suspended from the hoist cables, the logs dropping into the pit when the slings are opened.

While each of the release mechanism may be manually worked for the release of the sling cable associated with it by the drawing back of the bracket to remove the pin from the cable fitting, the cables may be simultaneously released mechanically, by means of a suitable actuating device 74 secured to the forward support arm by suitable means, a connecting member 75, such as a rod or chain, leading therefrom to the release rod 61 to which it is fixedly secured; the actuating device preferably being remotely controlled, such as from the tractor, the operation of the device causing the member 75 to pull the release rod forward sufficiently that the release mechanism at all support arms is operated to draw the pins simultaneously from the cables, a spring 76 mounted on the release rod being compressed when the rod is drawn forward and expanding when forward pressure is removed, thus automatically returning the release rod and release mechanism to their normal position.

It is of course understood that the support arms and the top beams of the frame-work may all consist of single members made integral with the center beam and extending laterally therefrom on each side.

The body of the long carrier is readily adaptable for running gear other than wheels, such as runners for winter work over snow, if desirable.

It is of course understood that modifications and ramifications may be made without in any way departing from the spirit of the invention as hereinabove described and illustrated.

What we claim is:

1. In a log carrier, a motive power means, a trailer suitably supported by said motive power means and adapted to be drawn thereby, said trailer comprising an inverted U-shaped frame-work, a running gear mounted on said frame-work and supporting the rear of said trailer, a longitudinal beam supported by said inverted U-shaped frame-work at the top thereof, a plurality of lateral support arms joined to said longitudinal beam, a longitudinal rod supported at one end of said lateral support arms and being movable with respect to same, a plurality of fairleads rotatably supported at the opposite ends of said lateral support arms, a plurality of brackets supported by said longitudinal rod and movable with respect to same and being adjacent said lateral support arms, and a plurality of slings supported by said brackets and extending downward therefrom, a plurality of hoisting cables extending over said fairleads and detachably connected to said slings, a plurality of horizontally positioned fairleads, a longitudinal cable, each of said hoisting cables extending over said horizontally positioned fairleads and being connected to said longitudinal cable, a winch mounted on said motive power means and suitably connected to said longitudinal cable for actuating the latter, thus raising said slings simultaneously above the ground level.

2. In a log carrier, a motive power means, a trailer having the front end thereof supported by said motive power means, said trailer comprising an inverted U-shaped frame-work, wheels rotatably mounted on each side of said inverted U-shaped frame-work, a longitudinal beam supported by the upper portion of said inverted U-shaped frame-work, lateral support arms joined to said longitudinal beam, a holding mechanism supported at one end of said lateral support arms, a plurality of slings detachably secured to said holding mechanism, a plurality of fairleads rotatably supported at the opposite end of said lateral support arms to that of said holding mechanism, a longitudinal cable, a plurality of hoisting cables connected to said longitudinal cable and extending over said fairleads, and means for detachably securing the free ends of said hoisting cables to said slings, and a winch adapted to actuate said longitudinal cable, said slings adapted to support a plurality of logs substantially above the ground level, and said holding mechanism having means for simultaneously releasing all of said slings therefrom.

3. In a log carrier, a motive power means, a trailer having the front end thereof supported by said motive power means, said trailer comprising an inverted U-shaped frame-work, wheels rotatably mounted on each side of said inverted U-shaped frame-work, a longitudinal beam supported by the upper portion of said inverted U-shaped frame-work, lateral support arms joined to said longitudinal beam, a holding mechanism supported at one end of said lateral support arms, a plurality of slings detachably secured to said holding mechanism, a plurality of fairleads rotatably supported at the opposite end of said lateral support arms to that of said holding mechanism, a longitudinal cable, a plurality of hoisting cables connected to said longitudinal cable and extending over said fairleads, and means for detachably securing the free ends of said hoisting cables to said slings, and a winch adapted to actuate said longitudinal cable, said slings being detached from each of said hoisting cables before the positioning of said trailer over a load of logs, said slings being passed under the logs and reattached to said hoisting cables, and said winch drawing said longitudinal cable forward thus actuating said hoisting cables and accordingly raising said slings, and said holding mechanism securing the opposite ends of said slings having means for simultaneously releasing said slings, thereby dropping the load of logs from within said inverted U-shaped frame-work of said trailer.

RONALD ROULEAU ALEXANDER.
WILLIAM P. O'BRIEN.

REFERENCES CITED

The following references are of record in the file of this patent:

UNITED STATES PATENTS

| Number | Name | Date |
|---|---|---|
| 2,240,564 | Le Tourneau | May 6, 1941 |
| 2,276,127 | Wahl | Mar. 10, 1942 |
| 2,321,198 | Graves | June 8, 1943 |
| 2,361,181 | Dowd | Oct. 24, 1944 |
| 2,404,898 | Aycock | July 30, 1946 |
| 2,454,675 | Showalter | Nov. 23, 1948 |
| 2,472,557 | Wills | June 7, 1949 |